US009008508B2

(12) United States Patent
Liu

(10) Patent No.: US 9,008,508 B2
(45) Date of Patent: Apr. 14, 2015

(54) METHOD AND DEVICE FOR DETECTING INBAND OPTICAL SIGNAL TO NOISE RATIO

(75) Inventor: Ning Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 517 days.

(21) Appl. No.: 13/406,908

(22) Filed: Feb. 28, 2012

(65) Prior Publication Data
US 2012/0155861 A1 Jun. 21, 2012

Related U.S. Application Data

(63) Continuation of application No. PCT/CN2009/073634, filed on Aug. 31, 2009.

(51) Int. Cl.
H04B 10/08 (2006.01)
H04B 10/079 (2013.01)
H04B 10/077 (2013.01)

(52) U.S. Cl.
CPC ...... H04B 10/07953 (2013.01); H04B 10/0775 (2013.01)

(58) Field of Classification Search
CPC .................. H04B 10/07953; H04B 10/07955; H04B 10/079; H04B 10/0775; H04B 10/077
USPC .............................................. 398/26, 25, 33
See application file for complete search history.

(56) References Cited

U.S. PATENT DOCUMENTS 5,513,029 A 4/1996 Roberts
6,204,945 B1 3/2001 Iwata et al.
(Continued)

FOREIGN PATENT DOCUMENTS

CN 1170286 A 1/1998
CN 1852055 A 10/2006
(Continued)

OTHER PUBLICATIONS

Extended European Search Report in corresponding European Patent Application No. 09848621.0 (May 3, 2013).
(Continued)

Primary Examiner — M. R. Sedighian
(74) Attorney, Agent, or Firm — Leydig, Voit & Mayer, Ltd.

(57) ABSTRACT

A method and a device for detecting Inband Optical Signal to Noise Ratio (OSNR) are provided in the present invention, wherein the method includes the following steps: obtaining a signal power $P_{CW1}$ of a first optical signal at a transmitting end, a signal power $P_{CW2}$ of a second optical signal at the transmitting end, and a total signal power $P_S$; obtaining a ratio k1 of the $P_{CW2}$ to the $P_S$ and a ratio k2 of the $P_{CW1}$ to the $P_{CW2}$ according to the $P_{CW1}$, $P_{CW2}$ and $P_S$; obtaining a signal power $P'_{CW1}$ of the first optical signal at a detection point and a signal power $P'_{CW2}$ of the second optical signal at the detection point; obtaining a ratio K3 of the $P'_{CW1}$ to the $P'_{CW2}$ according to the $P'_{CW1}$ and the $P'_{CW2}$; and obtaining the Optical Signal to Noise Ratio according to the k1, k2, and k3.

13 Claims, 5 Drawing Sheets

(56) References Cited

U.S. PATENT DOCUMENTS

| | | | |
|---|---|---|---|
| 6,748,169 | B1 | 6/2004 | Geiger et al. |
| 6,952,529 | B1* | 10/2005 | Mittal ............................. 398/26 |
| 7,149,428 | B2 | 12/2006 | Chung et al. |
| 7,440,170 | B2* | 10/2008 | Kao et al. .................... 359/337.2 |
| 8,073,325 | B2* | 12/2011 | Goto ............................... 398/26 |
| 2004/0101300 | A1* | 5/2004 | Bialas et al. .................... 398/26 |
| 2004/0161233 | A1 | 8/2004 | Zalevsky et al. |
| 2006/0051087 | A1* | 3/2006 | Martin et al. .................... 398/26 |
| 2007/0297043 | A1* | 12/2007 | Kao et al. ...................... 359/337 |
| 2008/0080857 | A1 | 4/2008 | Goto |
| 2008/0124076 | A1* | 5/2008 | Rudolph et al. ................ 398/26 |
| 2009/0142052 | A1* | 6/2009 | Pegg et al. ...................... 398/26 |
| 2012/0076497 | A1 | 3/2012 | Li |

FOREIGN PATENT DOCUMENTS

| | | |
|---|---|---|
| CN | 101043268 A | 9/2007 |
| CN | 101145838 A | 3/2008 |
| CN | 101312376 A | 11/2008 |
| EP | 1156608 A2 | 11/2011 |
| RU | 2129184 C1 | 4/1999 |
| WO | WO 2004114567 A1 | 12/2004 |
| WO | WO 2008/122123 A1 | 10/2008 |

OTHER PUBLICATIONS

1$^{st}$ Office Action in corresponding Russian Patent Application No. 2012112513 (Mar. 28, 2013).

Lee, J. H. et al,, "OSNR Monitoring Technique Using Polarization-Nulling Method," IEEE Photonics Technology Letters, vol, 13, No. 1, Jan. 2001.

Lee, J. H. et al., "A Review of the Polarization-Nulling Technique for Monitoring Optical-Signal-to-Noise Ratio in Dynmic WDM Networks," Journal of lightwave Technology, vol. 24, No. 11, Nov. 2006.

Written Opinion of the International Searching Authority (translation) dated (mailed) Jun. 3, 2010, issued in related Application No. PCT/CN2009/073634, filed Aug. 31, 2010, Huawei Technologies Co., Ltd.

International Search Report for International Application No. PCT/CN2009/073634, mailed Jun. 3, 2010 Huawei Technologies Co., Ltd.

Source: Nortel Networks, Title: Editorial comments on G.697 version 1.4, ITU-T Jun. 23, 2009.

TIA/EIA Standard OFSTP-A9 "Optical Signal-to-Noise Ratio Measurement Procedures for Dense Wavelength-Division Multiplexed Systems," ANSI/TIA/EIA-526-19-2000, Jun. 2000.

* cited by examiner

METHOD AND DEVICE FOR DETECTING INBAND OPTICAL SIGNAL TO NOISE RATIO

CROSS-REFERENCE TO RELATED APPLICATIONS

This application is a continuation of International Application No. PCT/CN2009/073634, filed on Aug. 31, 2009, which is hereby incorporated by reference in its entirety.

FIELD OF THE INVENTION

The present invention relates to the field of optical communication, and in particular, to a method and a device for detecting Inband Optical Signal to Noise Ratio.

BACKGROUND

With arising of large-capacity service, an optical communication backbone network has a tendency to evolve from the rate of 10 Gbit/s to 40 Gbit/s and higher and at the same time the channel spacing gradually evolves from 100 GHz to 50 GHz. Moreover, opto-electrical conversion in the link tends to decrease, which makes it more difficult to directly detect the bit error rate at the electrical layer; while detecting the bit error rate at the link terminal interferes with fault location. As commercial networks widely adopt a rate of 40 Gbit/s and higher, it becomes increasingly important to perform Optical Performance Monitoring (Optical Performance Monitoring, OPM) on Dense Wavelength Division Multiplexing (Dense Wavelength Division Multiplexing, DWDM) signals to effectively control and manage optical networks. The Optical Signal to Noise Ratio (Optical Signal to Noise Ratio, OSNR) may reflect the signal quality accurately and thus is an important performance indicator required to be detected.

The traditional OSNR detection uses the linear interpolation method in which the inband noise is estimated by measuring the inter-channel outband noise and then the OSNR is calculated. This method is effective for simple low-speed point-to-point DWDM networks. However, with wide use of optical sub-systems such as the Reconfigurable Optical Add-Drop Multiplexer (ROADM), which carry the optical filter, the outband noise between channels is restricted by filtering and is smaller than the inband noise in the wavelength of the actual channels, resulting in inaccuracy for the method which uses the outband noise to calculate the inband noise, and higher OSNR value detected.

In addition, for high-speed DWDM networks with the rate of 40 Gbit/s and higher, on one hand, because of broad signal spectrum width, the filter fails to cover all signal powers at the time of obtaining signal power, resulting in lower detection power; on the other hand, because of small space between channels, signals of the channel or adjacent channels cross into the filter at the time of measuring the outband noise and are mistaken as noise, resulting in higher value of detected noise. The two comprehensive effects cause the OSNR value to be relatively small.

To solve the problem that outband OSNR detection is inaccurate, inband ONNR detection will play an important role in next-generation optical networks.

Two inband OSNR detection methods are adopted in the prior art, wherein the signals involved are polarized light, and unpolarized light features Amplified Spontaneous Emission (Amplified Spontaneous Emission, ASE). At the detection point, the light to be detected passes through a polarization controller and then through a polarization beam splitter or two vertical linear polarizers. By continuously adjusting the polarization controller to change the polarization state of signals, the maximum and minimum values of light intensity on two output ports are obtained. When the polarization state of signals is in the same polarization direction with the linear polarizer, the signals can pass completely, but only a half of the noise, whose polarization state is in the same polarization direction with the linear polarizer, can pass. In this case, the light intensity is at the maximum, being the signal power plus a half of noise power.

$$P_{max} = P_S + \frac{1}{2}P_N \quad (1)$$

Similarly, when the polarization direction of the polarization state of signals is perpendicular to that of the linear polarizer, the light intensity is at the minimum, which is only a half of the noise power.

$$P_{min} = \frac{1}{2}P_N \quad (2)$$

With this method, inband OSNR detection is implemented.

$$OSNR = \frac{P_S}{P_N} = \frac{P_{max} - P_{min}}{2P_{min}} \quad (3)$$

In implementation of the preceding inband OSNR detection, the inventor finds that the prior art has at least the following problems.

1. An expensive high-speed polarization controller is required to scan the polarization state, which leads to a high detection cost.

2. The polarization states of signals in each channel are different, and thus polarization state scanning needs to be performed on all channels, which results in a slow detection speed.

3. The method is based on the assumption that signals are in a single polarization state, and thus is incapable to be used in the Polarization Division Multiplexing (Polarization Division Multiplexing, PDM) system. However, the PDM system will be widely adopted in the future 100 Gbit/s high-speed system.

In a word, the polarization devices in the prior art are high in cost and slow in scanning speed, and is not applicable to the PDM system, and the DWDM systems with the rate of 40 Gbit/s or higher, 50 GHz spacing and signal bandwidth close to channel bandwidth.

SUMMARY

The embodiments of the present invention provide a method and a device for detecting Inband Optical Signal to Noise Ratio, to solve the problems in the prior art in which the polarization devices are high in cost and low in scanning speed, and not applicable to the PDM system. The method and device herein are applicable to the DWDM system with a rate of 40 Gbit/s or higher, 50 GHz spacing and signal band width close to channel bandwidth.

To achieve the above objectives, the following technical solutions are adopted in the embodiments of the present invention:

A method for detecting Inband Optical Signal to Noise Ratio, including:

obtaining the signal power $P_{CW1}$ of a first optical signal at the transmitting end, the signal power $P_{CW2}$ of a second optical signal at the transmitting end, and the total signal power $P_S$ of the channel where the first optical signal and the second optical signal are located;

obtaining the ratio k1 of $P_{CW2}$ to $P_S$ and the ratio k2 of $P_{CW1}$ to $P_{CW2}$, according to $P_{CW1}$, $P_{CW2}$, and $P_S$;

obtaining the signal power $P'_{CW1}$ of the first optical signal at the detection point and the signal power $P'_{CW2}$ of the second optical signal at the detection point;

obtaining the ratio k3 of $P'_{CW1}$ to $P'_{CW2}$; and obtaining the Optical Signal to Noise Ratio according to k1, k2, and k3.

A device for detecting signal, including:

an optical filter unit, configured to filter the optical channel to be detected and obtain a first optical signal and a second optical signal of different bands;

an opto-electrical conversion unit; configured to covert optical signals to electrical signals;

a data collection unit, configured to obtain the signal power $P_{CW1}$ of the first optical signal at the transmitting end, the signal power $P_{CW2}$ of the second optical signal at the transmitting end, and the total signal power $P_S$ of the channel where the first signal and second signal are located after the optical signals are processed by the opto-electrical conversion unit;

a data processing unit, configured to, according to $P_{CW1}$, $P_{CW2}$, and $P_S$, calculate the ratio k1 of $P_{CW2}$ to $P_S$ and the ratio k2 of $P_{CW1}$ to $P_{CW2}$; and a sending unit, configured to send the ratios k1 and k2 to the detection device at the detection point.

A device for detecting at a detection point, including:

a recording unit, configured to record the ratio k1 of a signal power $P_{CW2}$ of a second optical signal collecting at a transmitting end and the total signal power $P_S$ of the channel where a first signal and the second signal are located, and the ratio k2 of the signal power $P_{CW1}$ of the first optical signal to the $P_{CW2}$;

an optical filter unit, configured to filter the optical channel to be detected and obtain the first optical signal and the second optical signal;

an opto-electrical conversion unit, configured to covert the optical signals to the electrical signals;

a data collection unit, configured to obtain the signal power $P'_{CW1}$ of the first optical signal at the detection point and the signal power $P'_{CW2}$ of the second optical signal at the detection point after the optical signals are processed by the opto-electrical conversion unit, and then calculate the ratio k3 of the $P'_{CW1}$ to the $P'_{CW2}$; and a data processing unit, configured to, according to k1, k2, and k3, calculate the Optical Signal to Noise Ratio.

The embodiments of the present invention provide the method and device for detecting Inband Optical Signal to Noise Ratio, in which the powers of the first optical signal and second optical signal and the power ratios thereof are obtained at the transmitting end; and at the detection point, the powers of the first optical signal and second optical signal and the power ratios thereof are also obtained and the power ratios at the detection point and the signal power ratios at the transmitting end are compared for calculation, thereby detecting the Inband Optical Signal to Noise Ratio. In this way, the detection cost is reduced, if only the optical filters are widely used in optical performance detection without additional polarization associated devices. In addition, the detection is accelerated, if only the optical powers of two wavelengths are detected without searching the various polarization states. Moreover, this method and device may be used in the Dense Wavelength Division Multiplexing system with signal spectral width close to channel bandwidth, also be used in the Polarization Division Multiplexing system due to the detection method being independent of the polarization feature of signals, thus featuring wide applications.

BRIEF DESCRIPTION OF THE DRAWINGS

To more clearly describe the embodiments of the present invention or the technical solution of the prior art, the following provides brief description of the drawings in the embodiments or the prior art. It is apparent that the following drawings involve only the embodiments of the present invention, and those skilled in the art may obtain other relevant drawings based on these drawings without making any creative effort.

DETAILED DESCRIPTION

The following is a detailed description of the embodiments of the present invention with reference to the drawings. It is apparent that these embodiments are only a part of the embodiments of the present invention. The invention covers all the other embodiments obtained by those skilled in the art based on the embodiments of the present invention without making creative efforts.

Figure 1:
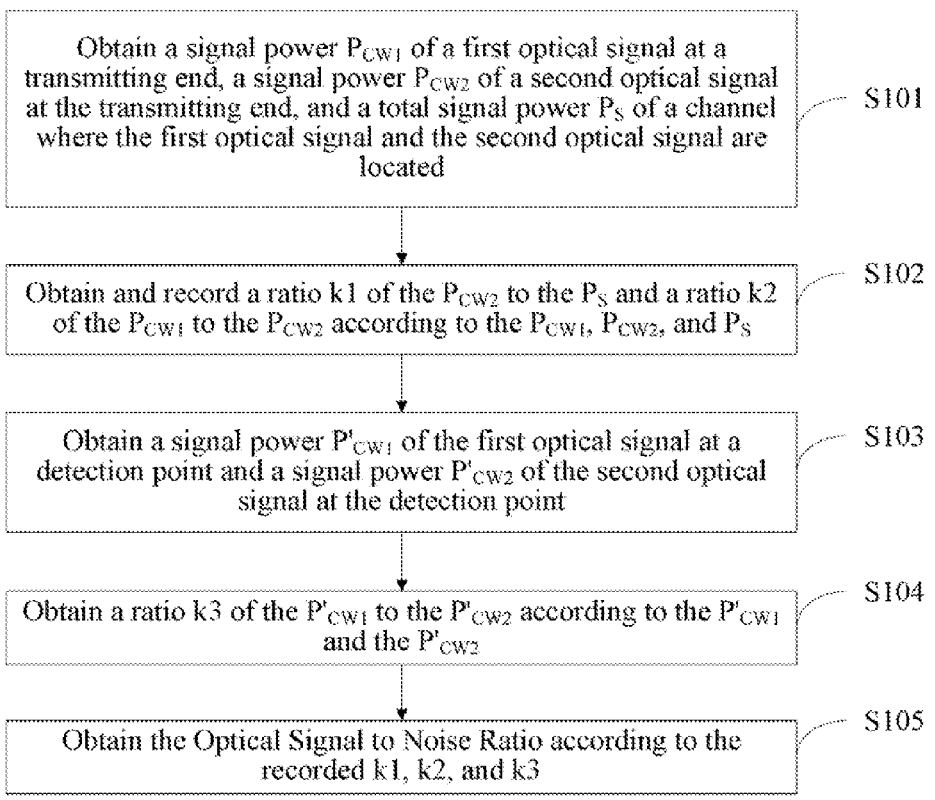
FIG. 1 is a flow block diagram of a method for detecting Inband Optical Signal to Noise Ratio provided in an embodiment of the present invention.

A method for detecting inband Optical Signal to Noise Ratio is provided in an embodiment of the present invention. As shown in FIG. 1, the method includes the following steps:

S101: Obtain a signal power $P_{CW1}$ of a first optical signal at a transmitting end, a signal power $P_{CW2}$ of a second optical signal at the transmitting end, and a total signal power $P_S$ of a channel where the first optical signal and second optical signal are located;

The first optical signal and second optical signal may be those being different in central wavelength and same in bandwidth.

Further, the first optical signal is at the edge of the signal spectrum and the second optical signal is at the center of the signal spectrum.

S102: Obtain and record the ratio k1 of $P_{CW2}$ to $P_S$ and the ratio k2 of $P_{CW1}$ to $P_{CW2}$ according to $P_{CW1}$, $P_{CW2}$, and $P_S$.

Obtaining and recording the ratio k1 of $P_{CW2}$ to $P_S$ and the ratio k2 of $P_{CW1}$ to $P_{CW2}$ in S102 includes obtaining the ratio k1 of $P_{CW2}$ to $P_S$ and the ratio k2 $P_{CW1}$ to $P_{CW2}$ and then recording k1 and k2 on site or on a network management information and storing in the OSNR detection device at the detection point.

S103: Obtain the power $P'_{CW1}$ of the first optical signal and the power $P'_{CW2}$ of the second optical signal at the detection point.

S104: Calculate the ratio k3 of $P'_{CW1}$ to $P'_{CW2}$.

S105: Calculate the Optical Signal to Noise Ratio according to k1, k2, and k3.

Specifically, the Optical Signal to Noise Ratio is:

$$OSNR = \frac{(1-k_3)B_{CW2}}{k_1(k_3-k_2)B_r},$$

wherein the $B_{CW2}$ is the bandwidth of filter CW2, assuming that a user knows the bandwidth $B_{CW2}$ of filter CW2 when obtaining filter CW2, the bandwidth being marked on filter CW2 or being measured after the user obtains the filter; Br is the reference bandwidth of the noise power, and the value is 0.1 nm, which is defined by the system. For the detailed calculation procedure, see the second embodiment.

A method for detecting Inband Optical Signal to Noise Ratio is provided in an embodiment of the present invention to obtain the power and the power ratios of the first optical signal and second optical signal both at the transmitting end and the detection point; and at the detection point, compare the power ratios at the detection point and the power ratios at the transmitting end to obtain the Inband Optical Signal to Noise Ratio. In this way; only the optical filter that is widely used in optical performance detection is required, which needs no extra devices such as the polarization controller and reduces the detection cost. In addition, only the optical power of two wavelengths rather than the polarization states of different bands needs to be detected, which increases the detection speed. Moreover, this method can be used in the DWDM system whose signal spectral width is close to channel bandwidth. Irrelevant to the polarization feature of signals, this method can also be used in the PDM system, thus featuring wide applications.

Another method for detecting Inband Optical Signal to Noise Ratio provided in an embodiment of the present invention is based on the following prerequisites:

1. The ASE noise is smooth within the band of the channel. For the ASE noise that can be considered as white Gaussian noise, this prerequisite is available within a single channel.

2. The bandwidth of the filter is smaller than the signal spectral width. This prerequisite is available for systems with a rate of 40 Gbit/s or higher.

3. The signal spectrum does not deform during transmission. This prerequisite is available when the signal transmission is normal and the error bit rate is not large.

Figure 2:
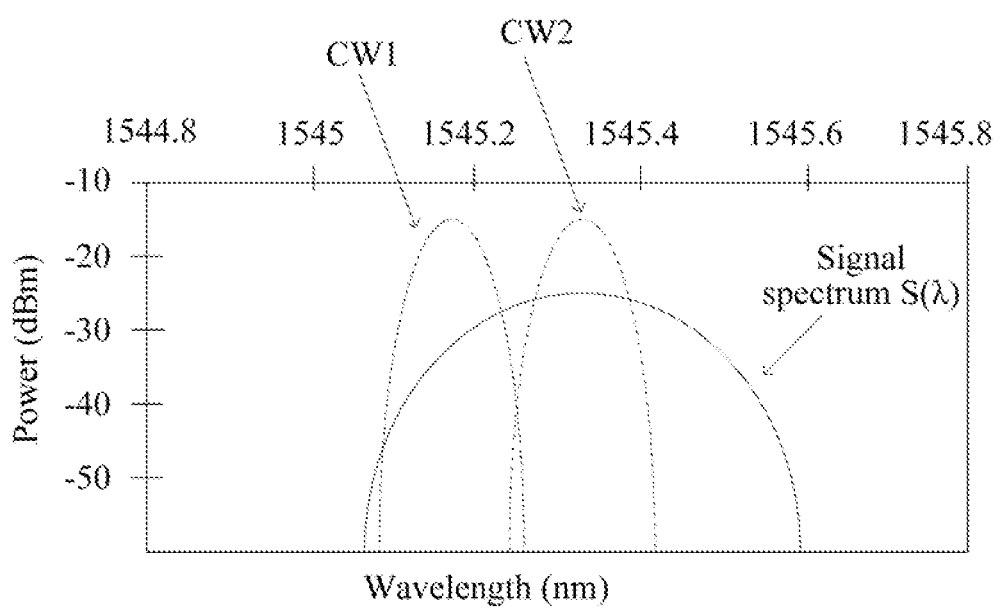
FIG. 2 shows a schematic diagram of optical spectrum detection at the transmitting end.

FIG. 2 is a schematic diagram of signal spectrum detection at the transmitting end. Two filters that has different central wavelengths and same bandwidth and whose bandwidth is smaller than the signal bandwidth are used, namely, CW1 and CW2. CW1 is at the edge of the signal spectrum and CW2 is at the center of the signal spectrum. For a specific signal code pattern, the power spectral density of signals is fixed.

First, the signal power respectively at CW1 and CW2 and the total signal power $P_S$ of the channel where CW1 and CW2 are located are obtained at the transmitting end before the ASE noise is introduced.

$$P_{CW1} = \int_{CW1} S(\lambda)d\lambda \quad (4)$$

$$P_{CW2} = \int_{CW2} S(\lambda)d\lambda \quad (5)$$

$$P_S = \int_{channel} S(\lambda)d\lambda \quad (6)$$

Formula (4) is used to calculate the signal power of the output signal of CW1; formula (5) is used to calculate the signal power of the output signal of CW2; and formula (6) is used to calculate the total power.

The signal power at CW1 and CW2 is different because the power spectral density of signals is not smooth. Based on the power calculation results, the ratio k1 of the output signal power of CW2 to the total signal power and the ratio k2 of the output signal power of CW1 to that of CW2 can be calculated. The signal power spectrum information, that is, k1 and k2, can be recorded on the detection device onsite or on the NMS.

$$k_1 = P_{CW2}/P_S \quad (7)$$

$$k_2 = P_{CW1}/P_{CW2} \quad (8)$$

Figure 3:
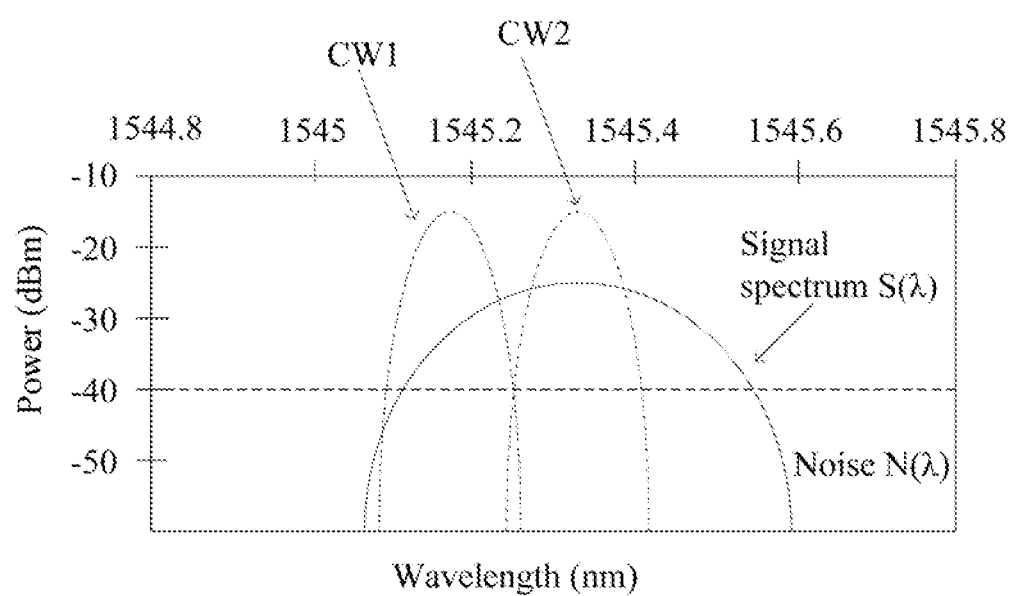
FIG. 3 shows a schematic diagram of optical spectrum detection at the detection point.

At the detection point, because of the ASE noise introduced by the Erbium Doped Fiber Amplifier (EDFA) during line transmission, the same optical filters CW1 and CW2 are used to perform filter and optical power detection. The detected optical power is the signal power plus the noise power, as shown in FIG. 3.

$$P'_{CW1} = \int_{CW1} S(\lambda)d\lambda + \int_{CW1} N(\lambda)d\lambda \quad (9)$$

$$P'_{CW2} = \int_{CW2} S(\lambda)d\lambda + \int_{CW2} N(\lambda)d\lambda \quad (10)$$

Formula (9) is used to calculate the signal power of the output signal of CW1; formula (10) is used to calculate the signal power of the output signal of CW2.

The ratio of the signal power of CW1 to that of CW2 is recorded as k3.

$$k_3 = \frac{\int_{CW1} S(\lambda)d\lambda + \int_{CW2} N(\lambda)d\lambda}{\int_{CW2} S(\lambda)d\lambda + \int_{CW2} N(\lambda)d\lambda} \quad (11)$$

According to prerequisite 1, the noise power spectral density is smooth within the channel, and thus the noise power of CW1 is the same as that of CW2.

$$\int_{CW1} N(\lambda)d\lambda = \int_{CW2} N(\lambda)d\lambda \quad (12)$$

According to prerequisite 3, the signal spectrum does not deform during transmission. That is, k1 and k2 do not change, and thus can be obtained according to the pre-stored information in the detection system. In this case, k3 can be calculated using the following formula:

$$k_3 = \frac{k_2 + \int_{CW2} N(\lambda)d\lambda / \int_{CW2} S(\lambda)d\lambda}{1 + \int_{CW2} N(\lambda)d\lambda / \int_{CW2} S(\lambda)d\lambda} \quad (13)$$

According to the definition of OSNR, the Optical Signal to Noise Ratio value may be calculated from formulas (7), (8), and (13):

$$OSNR = \frac{(1-k_3)B_{CW2}}{k_1(k_3-k_2)B_r} \quad (14)$$

wherein $B_{CW2}$ is the bandwidth of filter CW2, assuming that a user knows the bandwidth $B_{CW2}$ of filter CW2 when obtaining filter CW2, the bandwidth being marked on filter CW2 or measured after the user obtains the filter; Br is the reference bandwidth of the noise power, the value being 0.1 nm which is defined by the system. Therefore, the OSNR value can be calculated by obtaining the optical power ratios of filtering at different bands.

A method for detecting Inband Optical Signal to Noise Ratio is provided in an embodiment of the present invention to obtain the output signal power of CW1 and CW2 and the power ratios both at the transmitting end and at the detection point; and at the detection point, compare the power ratios at the detection point and the power ratios at the transmitting end to obtain the Inband Optical Signal to Noise Ratio. In this way, only the optical filter that is widely used in optical performance detection is required, which needs no extra devices such as the polarization controller and reduces the detection cost. In addition, only the optical power of two wavelengths rather than the polarization states of different bands needs to be detected, which increases the detection speed. Moreover, this method can be used in the DWDM system whose signal spectral width is close to channel bandwidth. Irrelevant to the polarization feature of signals, this method can also be used in the PDM system, thus featuring wide applications.

Figure 4:
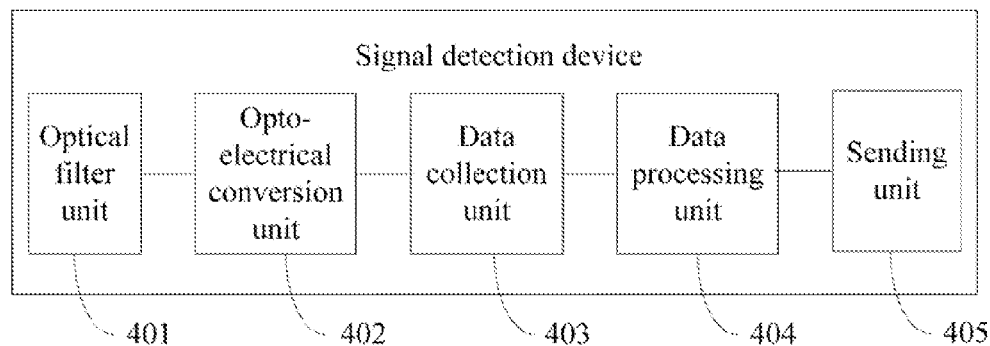
FIG. 4 shows a structure block diagram of a signal detection device provided in an embodiment of the present invention.

A signal detection device is provided in an embodiment of the present invention, as shown in FIG. 4. The device includes:

an optical filter unit 401, configured to filter the optical channel to be detected and obtain the first optical signals and second optical signals of different bands at the transmitting end:

an opto-electrical conversion unit 402, configured to covert optical signals to electrical signals;

a data collection unit 403, configured to obtain the power $P_{CW1}$ of the first optical signal, the power $P_{CW2}$ of the second optical signal, and the total power $P_S$ of the channel where the first signal and second signal are located at the transmitting end after the optical signals are processed by the opto-electrical conversion unit 402:

a data processing unit 404, configured to calculate the ratio k1 of $P_{CW2}$ to $P_S$ and the ratio k2 of $P_{CW1}$ to $P_{CW2}$ according to $P_{CW1}$, $P_{CW2}$, and $P_S$; and a sending unit 405, configured to send the ratios k1 and k2 to the detection point detection device.

In detail, the optical filter unit 401 can be a fixed optical filter or an adjustable optical filter. The functions of the optical filter unit 401, opto-electrical unit 402, and data collection unit 403 can all be implemented by the optical spectrum analyzer.

In addition, the first optical signal and second optical signal are optical signals that have different central wavelengths and same bandwidth. The first optical signal can be at the edge of the signal spectrum, and the second optical signal can be at the center of the signal spectrum.

Therefore, the signal detection device provided in an embodiment of the present invention can obtain the power of the first optical signal and second optical signal and the power ratios thereof at the transmitting end, so as to calculate the power ratios at the detection point and then obtain the Inband Optical Signal to Noise Ratio. Only the optical filter that is NNidely used in optical performance detection is required, which needs no extra devices such as the polarization controller and reduces the detection cost. In addition, only the optical power of two wavelengths rather than the polarization states of different bands needs to be detected, which increases the detection speed. Moreover, this signal detection device can be used in the DWDM system whose signal spectral width is close to channel bandwidth. Irrelevant to the polarization feature of signals, it can also be used in the PDM system, thus featuring wide applications.

Figure 5:
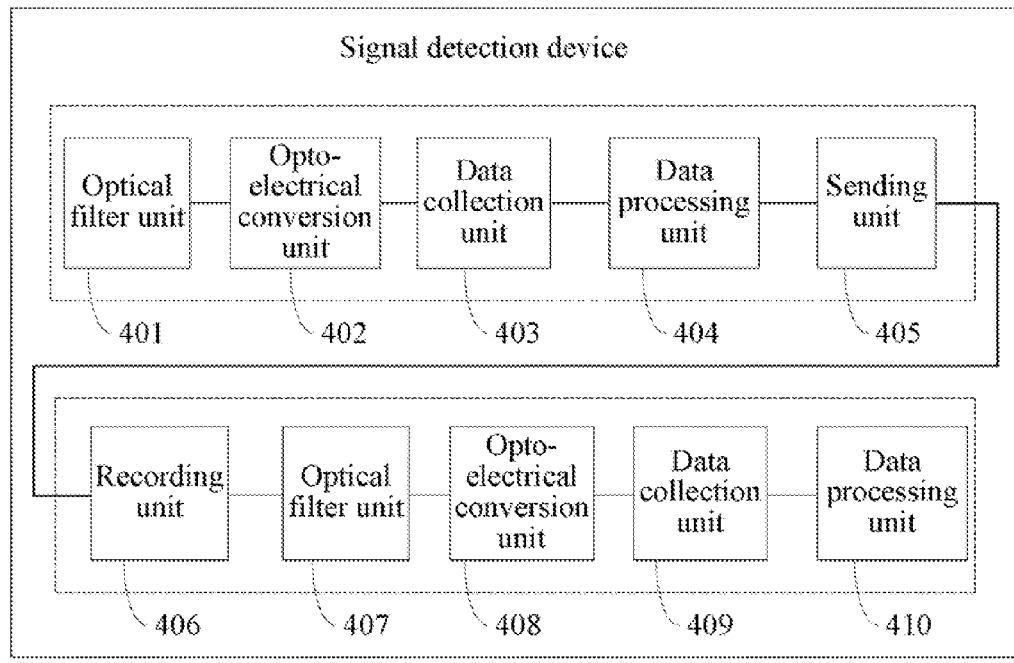
FIG. 5 shows a structure block diagram of signal detection device provided in an additional embodiment of the present invention.

Further, the signal detection device is provided in an embodiment of the present invention, as shown in FIG. 5. The device includes:

a recording unit 406, configured to record the received ratios k1 and k2;

an optical filter unit 407, configured to filter the optical channel to be detected and obtain the first optical signal and second optical signal at the detection point;

an opto-electrical conversion unit 408, configured to covert optical signals to electrical signals;

a data collection unit 409, configured to obtain the power $P'_{CW1}$ of the first optical signal, the power $P'_{CW2}$ of the second optical signal at the detection point after the optical signals are processed by the opto-electrical conversion unit, and calculate the ratio k3 of $P'_{CW1}$ and $P'_{CW2}$; and a data processing unit 410, configured to calculate the Optical Signal to Noise Ratio according to k1, k2, and k3.

In detail, $$OSNR = \frac{(1-k_3)B_{CW2}}{k_1(k_3-k_2)B_r},$$

wherein: $B_{CW2}$ is the bandwidth of filter CW2, assuming that a user knows the bandwidth $B_{CW2}$ of filter CW2 when obtaining filter CW2, the bandwidth being marked on filter CW2 or measured after the user obtains the filter; Br is the reference bandwidth of the noise power, the value being 0.1 nm which is defined by the system.

The optical filter unit 407 can be a fixed optical filter or an adjustable optical filter. The functions of the optical filter unit 407, opto-electrical unit 408, and data collection unit 409 can all be implemented by the optical spectrum analyzer.

The first optical signal and second optical signal are optical signals that have different central wavelengths and same bandwidth. The first optical signal can be at the edge of the signal spectrum, and the second optical signal can be at the center of the signal spectrum.

Thus, at the detection point, the signal detection device can obtain the power and power ratios of the first optical signal and second optical signal whose wavelength and bandwidth are the same as those of the first optical signal and second optical signal at the transmitting end, and then compare the power ratios at the detection point with the power ratios at the transmitting end to obtain the Inband Optical Signal to Noise Ratio. Only the optical filter that is widely used in optical performance detection is required at the detection point, which needs no extra devices such as the polarization controller and reduces the detection cost. In addition, only the optical power of two wavelengths rather than the polarization states of different bands needs to be detected, which increases the detection speed. Moreover, this signal detection device can be used in the DWDM system whose signal spectral width is close to channel bandwidth. Irrelevant to the polarization feature of signals, it can also be used in the PDM system, thus featuring wide applications.

Figure 6:
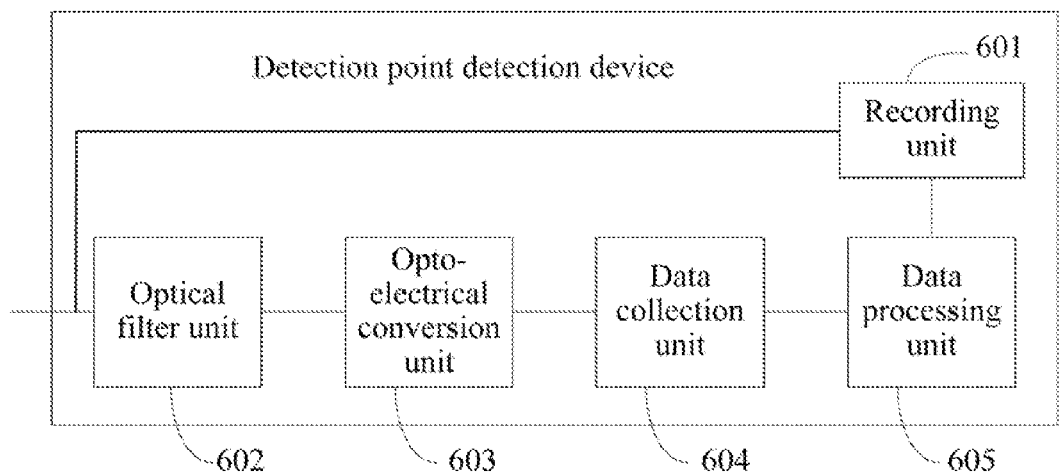
FIG. 6 shows a structure block diagram of the detection device at the detection point provided in an embodiment of the present invention.

A detection device at the detection point is provided in an embodiment of the present invention, as shown in FIG. 6. The device includes:

a recording unit 601, configured to record the ratio k1 of the power $P_{CW2}$ of the second optical signal to the total signal power $P_S$ of the channel where the first and second optical signals are located and the ratio k2 of the power $P_{CW1}$ of the first optical signal to the power $P_{CW2}$ of the second optical signal;

an optical filter unit 602, configured to filter the optical channel to be detected and obtain the first optical signal and second optical signal at the detection point;

an opto-electrical conversion unit 603, configured to covert optical signals to electrical signals;

a data collection unit 604, configured to obtain the power $P'_{CW1}$ of the first optical signal and the power $P'_{CW2}$ of the second optical signal at the detection point after the optical signals are processed by the opto-electrical conversion unit 603, and calculate the ratio k3 of $P'_{CW1}$ to $P'_{CW2}$; and a data processing unit 605, configured to calculate the Optical Signal to Noise Ratio according to k1, k2, and k3.

In detail, $$OSNR = \frac{(1-k_3)B_{CW2}}{k_1(k_3 - k_2)B_r},$$

wherein: $B_{CW2}$ is the bandwidth of filter CW2, assuming that a user knows the bandwidth $B_{CW2}$ of filter CW2 when obtaining filter CW2, the bandwidth being marked on filter CW2 or measured after the user obtains the filter; Br is the reference bandwidth of the noise power, the value being 0.1 nm which is defined by the system.

The optical filter unit 602 can be a fixed optical filter or an adjustable optical filter. The functions of the optical filter unit 603, opto-electrical unit 604, and data collection unit 604 can all be implemented by the optical spectrum analyzer.

In addition, the first optical signal and second optical signal are optical signals that have different central wavelengths and same bandwidth. The first optical signal can be at the edge of the signal spectrum, and the second optical signal can be at the center of the signal spectrum.

Thus, at the detection point, the detection device can obtain the power and power ratios of the first optical signal and second optical signal whose wavelength and bandwidth are the same as those of the first optical signal and second optical signal at the transmitting end, and then compare the power ratios at the detection point with those at the transmitting end to obtain the Inband Optical Signal to Noise Ratio. In this way, only the optical filter that is widely used in optical performance detection is required at the detection point, which needs no devices such as the polarization controller and reduces the detection cost. In addition, only the optical power of two wavelengths rather than the polarization states of different bands needs to be detected, which increases the detection speed. Moreover, this signal detection device can be used in the DWDM system whose signal spectral width is close to channel bandwidth. Irrelevant to the polarization feature of signals, it can also be used in the PDM system, thus featuring wide applications.

The detection device at the detection point provided in an embodiment of the present invention can also be implemented by two fixed optical filters and a peripheral circuit. This reduces the cost of a single optical filter. In the multichannel system, however, multiple fixed optical filters are required.

Figure 7:
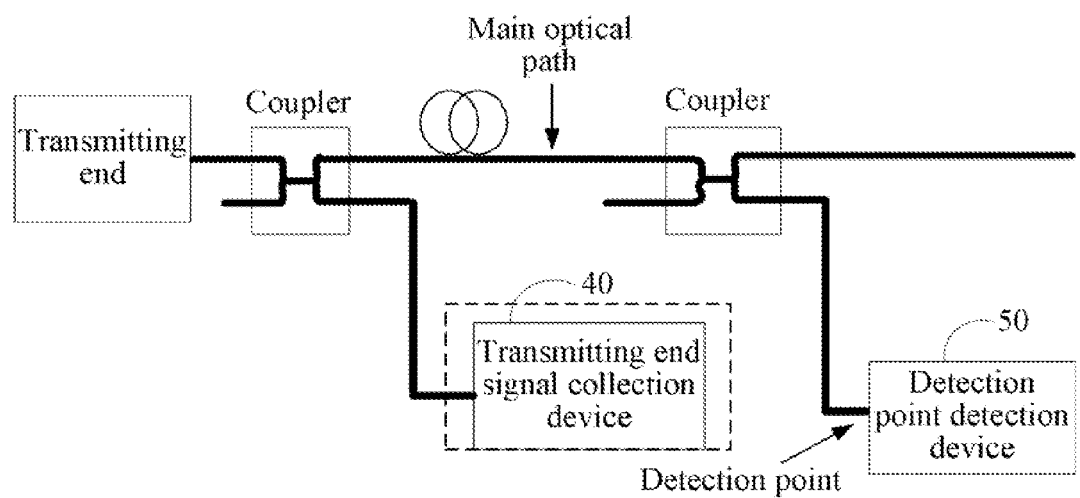
FIG. 7 shows a structural schematic diagram of a system for detecting Inband Optical Signal to Noise Ratio provided in an embodiment of the present invention.

A system for detecting Inband Optical Signal to Noise Ratio is provided in an embodiment of the present invention, as shown in FIG. 7. The system includes:

a transmitting-end signal collection device 40, configured to: obtain the power $P_{CW1}$ of the first optical signal, the power $P_{CW2}$ of the second optical signal, and the total power $P_S$ of the channel where the first optical signal and second optical signal are located at the transmitting end; calculate the ratio k1 of $P_{CW2}$ to $P_S$ and the ratio k2 of $P_{CW1}$ to $P_{CW2}$; send k1 and k2 to the detection device at the detection point, where: the transmitting end signal detection device 40 needs to perform detection only once at the transmitting end, and then uses the obtained k1 and k2 to detect the OSNR at multiple detection points because k1 and k2 remains unchanged in the system; and a detection point detection device 50, configured to: obtain the power $P'_{CW1}$ of the first optical signal, and the power $P'_{CW2}$ of the second optical signal; calculate the ratio k3 of $P'_{CW1}$ to $P'_{CW2}$; and calculate the Optical Signal to Noise Ratio according to k1, k2, and k3.

In detail, $$OSNR = \frac{(1-k_3)B_{CW2}}{k_1(k_3 - k_2)B_r},$$

wherein: $B_{CW2}$ is the bandwidth of filter CW2, assuming that a user knows the bandwidth $B_{CW2}$ of filter CW2 when obtaining filter CW2, the bandwidth being marked on filter CW2 or measured after the user obtains the filter; Br is the reference bandwidth of the noise power, the value being 0.1 nm which is defined by the system.

The system for detecting Inband Optical Signal to Noise Ratio provided in an embodiment of the present invention can obtain the power of the first optical signal and of second optical signal and the power ratios thereof at the transmitting end and those at the detection point; at the detection point, compare the ratios at the detection point and the ratios at the transmitting end to obtain the Inband Optical Signal to Noise Ratio. Only the optical filter that is widely used during optical performance detection is required, which needs no extra devices such as the polarization controller and reduces the detection cost. In addition, only the optical power of two wavelengths rather than the polarization states of different bands needs to be detected, which increases the detection speed. Moreover, this system for detecting Inband Optical Signal to Noise Ratio can be used in the DWDM system whose signal spectral width is close to channel bandwidth. Irrelevant to the polarization feature of signals, it can also be used in the PDM system, thus featuring wide applications.

Detailed above are only the exemplary embodiments of the present invention. The invention, however, is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for detecting Inband Optical Signal to Noise Ratio, the method performed by a signal detection device, comprising:

obtaining a signal power $P_{CW1}$ of a first optical signal at a transmitting end, a signal power $P_{CW2}$ of a second optical signal at the transmitting end, and a total signal power $P_S$ of a channel where the first optical signal and the second optical signal are located;

obtaining a ratio k1 of the $P_{CW2}$ to the $P_S$ and a ratio k2 of the $P_{CW1}$ to the $P_{CW2}$ according to the $P_{CW1}$, $P_{CW2}$, and $P_S$;

obtaining a signal power $P'_{CW1}$ of the first optical signal at a detection point and a signal power $P'_{CW2}$ of the second optical signal at the detection point;

obtaining a ratio k3 of the $P'_{CW1}$ to the $P'_{CW2}$ according to the $P'_{CW1}$ and the $P'_{CW2}$; and obtaining the Optical Signal to Noise Ratio according to the k1, the k2, and the k3.

2. The method for detecting Inband Optical Signal to Noise Ratio according to claim 1, wherein the Optical Signal to Noise Ratio obtained according to the recorded k1 and k2, and k3 is:

$$OSNR = \frac{(1-k_3)B_{CW2}}{k_1(k_3-k_2)B_r},$$

wherein the $B_{CW2}$ is a bandwidth of a filter CW2 from which the second optical signal is outputted, and where the $B_r$ is a reference bandwidth of noise power.

3. The method for detecting Inband Optical Signal to Noise Ratio according to claim 1, wherein the first optical signal and the second optical signal are different in central wavelength and are same in bandwidth.

4. The method for detecting Inband Optical Signal to Noise Ratio according to claim 3, wherein the first optical signal is at an edge of a signal spectrum, and the second optical signal is at a center of the signal spectrum.

5. The method for detecting Inband Optical Signal to Noise Ratio according to claim 1, wherein the obtaining a ratio k1 of the $P_{CW2}$ to the $P_S$ and a ratio k2 of the $P_{CW1}$ to the $P_{CW2}$ specifically comprises:

obtaining a ratio k1 of the $P_{CW2}$ to the $P_S$ and a ratio k2 of the $P_{CW1}$ to the $P_{CW2}$, and then recording the k1 and the k2 on site or on a Network Management Information.

6. A signal detection device, comprising:

a first optical filter unit, configured to filter an optical channel to be detected at a transmitting end and obtain a first optical signal and a second optical signal of different bands at the transmitting end;

a first opto-electrical conversion unit, configured to covert the optical signals to the electrical signals;

a first data collection unit, configured to obtain a signal power $P_{CW1}$ of the first optical signal at the transmitting end, a signal power $P_{CW2}$ of the second optical signal at the transmitting end, and a total signal power $P_S$ of a channel where the first optical signal and the second optical signal are located, after the optical signals are processed by the opto-electrical conversion unit;

a first data processing unit, configured to calculate a ratio k1 of the $P_{CW2}$ to the $P_S$ and a ratio k2 of the $P_{CW1}$ to the $P_{CW2}$ according to the $P_{CW1}$, $P_{CW2}$, and $P_S$; and a sending unit, configured to send the ratios k1 and k2 to a detection device at a detection point.

7. The signal detection device according to claim 6, further comprising:

a recording unit, configured to record the received ratios k1 and k2;

a second optical filter unit, configured to filter the optical channel to be detected at the detection point and obtain the first optical signal and second optical signal at the detection point;

a second opto-electrical conversion unit, configured to covert the optical signals to the electrical signals;

a second data collection unit, configured to obtain the signal power $P'_{CW1}$ of the first optical signal at the detection point and the signal power $P'_{CW2}$ of the second optical signal at the detection point after the optical signals are processed by the opto-electrical conversion unit, and then calculate the ratio k3 of the $P'_{CW1}$ to the $P'_{CW2}$; and a second data processing unit, configured to calculate an Optical Signal to Noise Ratio according to the k1, k2, and k3.

8. The signal detection device according to claim 7, wherein the Optical Signal to Noise Ratio obtained according to the recorded k1 and k2, and k3 is:

$$OSNR = \frac{(1-k_3)B_{CW2}}{k_1(k_3-k_2)B_r},$$

where the $B_{CW2}$ is a bandwidth of the second optical signal outputted by a filter CW2 in the second optical filter unit, and where the $B_r$ is a reference bandwidth of noise power.

9. The signal detection device according to claim 6, wherein the first optical signal and the second optical signal are different in central wavelength and are same in bandwidth; the first optical signal is at an edge of a signal spectrum, and the second optical signal is at a center of the signal spectrum.

10. The signal detection device according to claim 7, wherein the first optical signal and the second optical signal are different in central wavelength and are same in bandwidth; the first optical signal is at an edge of a signal spectrum, and the second optical signal is at a center of the signal spectrum.

11. A detection device at a detection point, comprising:

a recording unit, configured to record a received ratio k1 of a signal power $P_{cw2}$ of a second optical signal collected at a transmitting end and a total signal power $P_s$ of a channel where a first optical signal and the second optical signal are located, and a received ratio k2 of a signal power $P_{cw1}$ of the first optical signal to the $P_{cw2}$;

an optical filter unit, configured to filter a channel to be detected and obtain the first optical signal and second optical signal;

an opto-electrical conversion unit, configured to covert the optical signals to the electrical signals;

a data collection unit, configured to obtain a signal power $P'_{cw1}$ of the first optical signal at the detection point and a signal power $P'_{cw2}$ of the second optical signal at the detection point after the optical signals are processed by the opto-electrical conversion unit, and then calculate a ratio k3 of the $P'_{cw1}$ to the $P'_{cw2}$; and a data processing unit, configured to calculate an Optical Signal to Noise Ratio according to the k1, k2, and k3.

12. The detection device at the detection point according to claim 11, wherein the Optical Signal to Noise Ratio obtained according to the recorded k1 and k2, and k3 is:

$$OSNR = \frac{(1-k_3)B_{CW2}}{k_1(k_3-k_2)B_r},$$

where the $B_{CW2}$ is a bandwidth of the second optical signal outputted by a filter CW2 in the optical filter unit, and where the $B_r$ is a reference bandwidth of noise power.

13. The detection device at the detection point according to claim 11, wherein the first optical signal and the second optical signal are different in central wavelength and are same in bandwidth; the first optical signal is at an edge of a signal spectrum, and the second optical signal is at a center of the signal spectrum.

* * * * *